US010250181B2

(12) United States Patent
Vietas et al.

(10) Patent No.: US 10,250,181 B2
(45) Date of Patent: Apr. 2, 2019

(54) SOLAR PANEL SUPPORT DEVICES AND RELATED SOLAR PANEL SUPPORT SYSTEMS

(71) Applicant: RBI Solar, Inc., Cincinnati, OH (US)

(72) Inventors: William L. Vietas, Cincinnati, OH (US); Ben Urbanek, Cincinnati, OH (US); Mike Freshwater, Cincinnati, OH (US); Nick Allen, Dayton, KY (US)

(73) Assignee: RBI Solar, Inc., Cincinnati, OH (US)

( * ) Notice: Subject to any disclaimer, the term of this patent is extended or adjusted under 35 U.S.C. 154(b) by 29 days.

(21) Appl. No.: 15/286,684

(22) Filed: Oct. 6, 2016

(65) Prior Publication Data

US 2017/0111006 A1 Apr. 20, 2017

Related U.S. Application Data

(60) Provisional application No. 62/242,084, filed on Oct. 15, 2015.

(51) Int. Cl.
*H02S 20/23* (2014.01)
*H02S 20/24* (2014.01)
(Continued)

(52) U.S. Cl.
CPC ............... *H02S 20/23* (2014.12); *F24S 25/11* (2018.05); *F24S 25/30* (2018.05); *F24S 25/65* (2018.05);
(Continued)

(58) Field of Classification Search
CPC .......... H02S 20/23; H02S 20/10; H02S 20/24; F24J 2/5264; F24J 2/526; F24J 2/5237;
(Continued)

(56) References Cited

U.S. PATENT DOCUMENTS

| 1,305,692 A | * | 6/1919 | Curry | E04B 1/0007 52/126.1 |
| 3,715,850 A | * | 2/1973 | Chambers | E04F 13/0855 248/286.1 |

(Continued)

OTHER PUBLICATIONS

World Intellectual Property Organization, Status of International Registration No. DM/086946, retrieved from http://www.wipo.int/designdb/hague/en/showData.jsp?SOURCE=HAGUE&KEY=DM086946 on Apr. 22, 2016 (3 pages).

(Continued)

*Primary Examiner* — Ko H Chan
(74) *Attorney, Agent, or Firm* — Wood Herron & Evans LLP

(57) ABSTRACT

A support device for supporting a solar panel above a base surface includes a body having an upper mounting surface, a lower base surface, and integral ballast. The upper mounting surface is sloped relative to the lower base surface. The support device further includes at least one mounting element projecting upwardly from the upper mounting surface and configured to support a solar panel. A solar panel support system includes first and second support devices spaced apart from one another, each including a body having an upper mounting surface, a lower base surface, and integral ballast, the upper mounting surface being sloped relative to the lower base surface. Each support device further includes first and second mounting elements projecting upwardly from the upper mounting surface and configured to support solar panels. First and second purlins are supported by and extend between the first and second support devices, and are configured to support the solar panels.

16 Claims, 9 Drawing Sheets

(51) Int. Cl.
*H02S 20/10* (2014.01)
*F24S 25/30* (2018.01)
*F24S 25/11* (2018.01)
*F24S 25/65* (2018.01)
*F24S 25/70* (2018.01)

(52) U.S. Cl.
CPC .............. *F24S 25/70* (2018.05); *H02S 20/10* (2014.12); *H02S 20/24* (2014.12); *Y02B 10/12* (2013.01); *Y02E 10/47* (2013.01)

(58) Field of Classification Search
CPC . F24J 2/5203; F24S 25/11; F24S 25/65; F24S 25/70; F24S 25/30; Y02B 10/12; Y02E 10/47; E04B 7/02; E04B 1/41; E04B 1/24; E04G 17/14
USPC .......................................... 248/295.11, 296.1
See application file for complete search history.

(56) References Cited

U.S. PATENT DOCUMENTS

| | | | |
|---|---|---|---|
| 4,141,665 A * | 2/1979 | Snapp, Jr. | ............... F16C 11/10 297/378.12 |
| 4,796,403 A * | 1/1989 | Fulton | .................... E04D 3/362 52/478 |
| 5,937,609 A * | 8/1999 | Roth | ..................... E04B 1/4121 52/698 |
| 6,105,316 A | 8/2000 | Bottger et al. | |
| 7,553,109 B2 * | 6/2009 | Blundell | ............. E02D 29/0266 249/101 |
| 7,849,849 B2 | 12/2010 | Genschorek | |
| 7,918,054 B2 * | 4/2011 | Grafton | ..................... E04B 7/02 248/291.1 |
| 8,122,648 B1 * | 2/2012 | Liu | ........................ F24J 2/5245 126/623 |
| 8,272,176 B2 | 9/2012 | Wallgren | |
| 8,371,076 B2 | 2/2013 | Jones et al. | |
| 8,418,419 B1 | 4/2013 | Aseere et al. | |
| 8,522,491 B2 | 9/2013 | Kneip et al. | |
| 8,567,132 B2 | 10/2013 | Rothschild et al. | |
| 8,635,818 B2 | 1/2014 | Wildes | |
| 8,733,036 B2 | 5/2014 | Salam | |
| 8,869,471 B2 | 10/2014 | Wildes et al. | |
| 8,881,472 B2 | 11/2014 | Knapp | |
| 2001/0008143 A1 | 7/2001 | Sasaoka et al. | |
| 2004/0250491 A1 | 12/2004 | Diaz et al. | |
| 2009/0320904 A1 | 12/2009 | Botkin et al. | |
| 2011/0108083 A1 | 5/2011 | Ravestein et al. | |
| 2012/0023843 A1 * | 2/2012 | Stearns | ................... E04D 13/10 52/173.3 |
| 2012/0031469 A1 | 2/2012 | Loois et al. | |
| 2012/0036799 A1 | 2/2012 | Kneip et al. | |
| 2012/0097807 A1 * | 4/2012 | Rees | ..................... F24J 2/5203 248/121 |
| 2012/0255244 A1 | 10/2012 | Hendrickson et al. | |
| 2013/0048816 A1 * | 2/2013 | Wentworth | ............ F24J 2/5207 248/237 |
| 2013/0111830 A1 | 5/2013 | Aseere et al. | |
| 2013/0200016 A1 | 8/2013 | Lewenz et al. | |
| 2013/0200018 A1 | 8/2013 | Lewenz et al. | |
| 2013/0318893 A1 * | 12/2013 | Knapp | ................... F24J 2/5237 52/173.3 |
| 2013/0318894 A1 | 12/2013 | Khowaiter | |
| 2014/0083504 A1 * | 3/2014 | Kuo | ...................... H01L 31/042 136/259 |
| 2014/0102512 A1 | 4/2014 | Jones et al. | |

OTHER PUBLICATIONS

Renusol America, Data Sheet of Renusol GS Ballasted Mounting System for Ground Mount Applications, retrievied from http://www.renusolamerica.com/uploads/media/Renusol_GS_Data_Sheet.pdf on Nov. 3, 2016 (1 page).
Renusol America, Data Sheet of Renusol CS60 Ballasted Mounting System for Flat Roof & Ground Applications, retrievied from http://www.renusolamerica.com/uploads/media/Renusol_CS6O_Data_Sheet_01.pdf on Nov. 3, 2016 (2 pages).
Renusol America, Data Sheet of Renusol EW 10 Ballasted East-West Facing PV Mounting System for Flat-Roofs, retrievied from http://www.renusolamerica.com/uploads/media/Renusol_EW_Data_Sheet.pdf on Nov. 3, 2016 (1 page).
Sun Ballast, Basic Solar Systems 2015 Catalogue, Ideal Support for Photovoltaic Modules on Flat Roofs (40 pages).
Sun Ballast, Basic Solar Systems 2016 Catalogue, Ideal Support for Photovoltaic Modules on Flat Roofs (60 pages).

* cited by examiner

SOLAR PANEL SUPPORT DEVICES AND RELATED SOLAR PANEL SUPPORT SYSTEMS

CROSS-REFERENCE TO RELATED APPLICATION

This application claims the filing benefit of U.S. Provisional Application Ser. No. 62/242,084, filed Oct. 15, 2015, the disclosure of which is hereby incorporated by reference herein in its entirety.

TECHNICAL FIELD

The present invention relates generally to solar panel support systems and, more particularly, to solar panel support systems for use in ground mount and roof mount applications.

BACKGROUND

Solar panels, also referred to as photovoltaic modules, are commonly used for collecting solar energy from natural sunlight in both commercial and residential applications. A solar panel is generally comprised of a plurality of photovoltaic cells electrically connected together in a panel-like configuration, and housed within a panel frame. Solar panels may be grouped into an array consisting of hundreds or even thousands of solar panels for providing increased energy collection at a given installation site. The solar panels are generally mounted to and supported by a support system that elevates the solar panels above a base surface, such as a building rooftop or a ground surface, and that orients the solar panels at a desired angle relative to the base surface. As such, various solar panel support systems for roof mount and ground mount applications have been developed.

Traditional solar panel support systems for ground mount applications generally include one or more support devices each configured to support one or more solar panels above the ground surface. Such support devices of known support systems are anchored to the ground surface in generally one of several ways: (i) piercing the ground surface with one or more anchor elements that secure the support device to the ground; (ii) placing modular ballast on or in a cavity of the support device to adequately weigh down the support device for firm support on the ground, or (iii) providing the support device with a base portion having an integrated ballast of sufficient mass to adequately weigh down the support device to sufficiently secure it in place on the ground.

Each of the above described methods and associated support devices are deficient in various respects. With regard to the first method, in some ground mount applications piercing the ground surface may be undesirable, unfeasible, or otherwise inadequate for anchoring a support device due to environmental conditions, for example. With regard to the second method, modular ballast undesirably adds structural complexity and time-consuming steps to the installation and maintenance of a ground mount system. With regard to the third method, such support devices are traditionally in the form of large rectangular blocks to which various additional structural components, such as vertical posts, must be mounted in order to support the solar panels in a suitable orientation relative to the ground surface. Such a configuration yields yet another support structure of undesirable complexity.

Accordingly, there is a need for improvements to known solar panel support systems to address deficiencies such as those outlined above.

SUMMARY

In accordance with an exemplary embodiment of the invention, a support device for supporting a solar panel above a base surface includes a body having an upper mounting surface, a lower base surface, and integral ballast. The upper mounting surface is sloped relative to the lower base surface. The support device further includes at least one mounting element projecting upwardly from the upper mounting surface and configured to support a solar panel.

In accordance with another exemplary embodiment of the invention, a solar panel support system for supporting a plurality of solar panels above a base surface includes first and second support devices and first and second purlins. The first and second support devices are spaced apart from one another, and each includes a body having an upper mounting surface, a lower base surface, and integral ballast, the upper mounting surface being sloped relative to the lower base surface. Each support device further includes first and second mounting elements projecting upwardly from the upper mounting surface and configured to support the solar panels. The first and second purlins are supported by and extend between the first and second support devices, and are configured to support the solar panels.

Various additional features and advantages of the invention will become more apparent to those of ordinary skill in the art upon review of the following detailed description of exemplary embodiments taken in conjunction with the accompanying drawings. The drawings, which are incorporated in and constitute a part of this specification, illustrate one or more exemplary embodiments of the invention and, together with the general description given above and the detailed description given below, serve to explain the exemplary embodiments.

DETAILED DESCRIPTION

Figure 1:
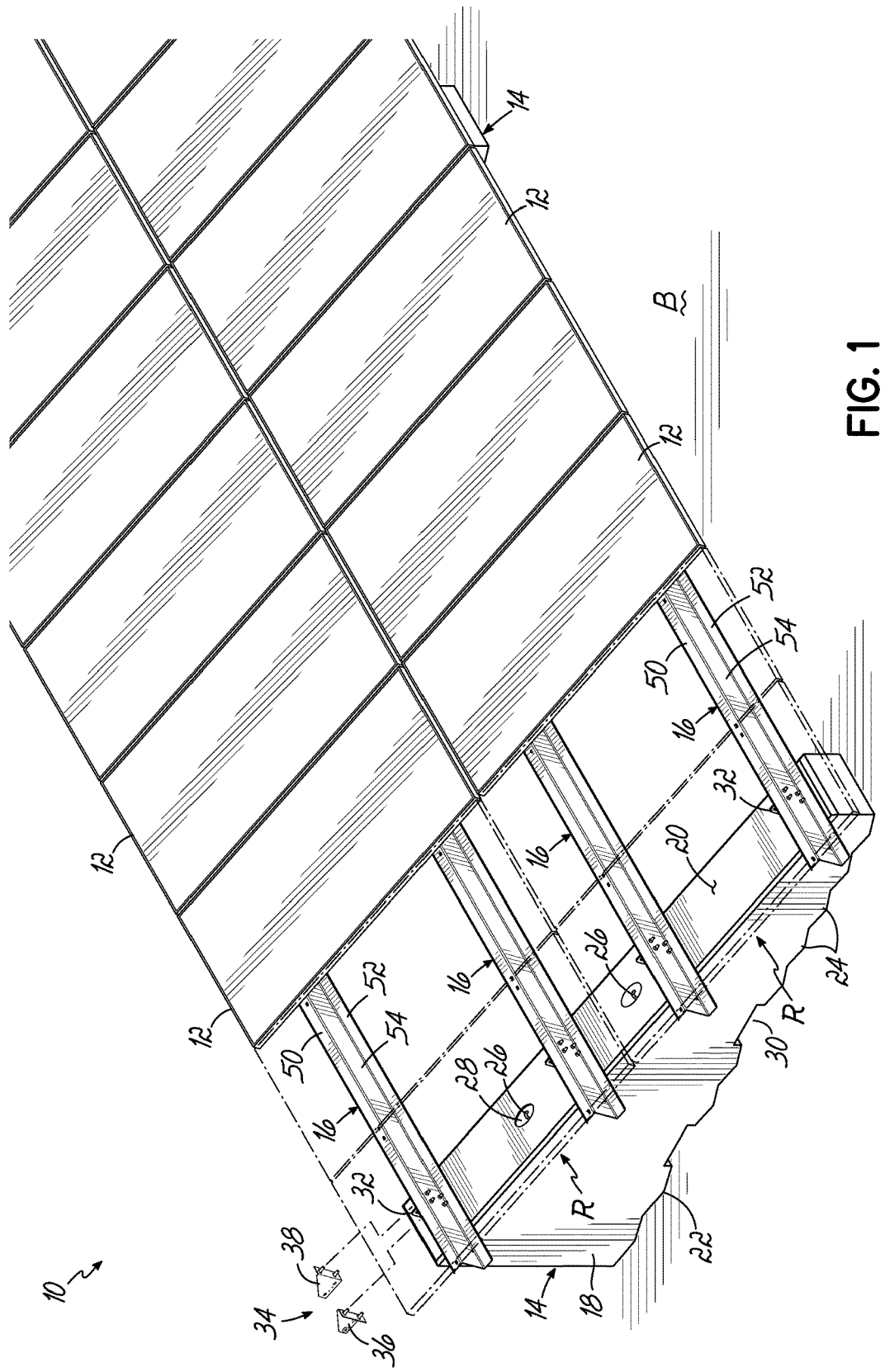
FIG. 1 is a partially disassembled front perspective view of a solar panel support system for supporting a plurality of solar panels according to an exemplary embodiment of the invention, with several of the solar panels shown in phantom.
Figure 2:
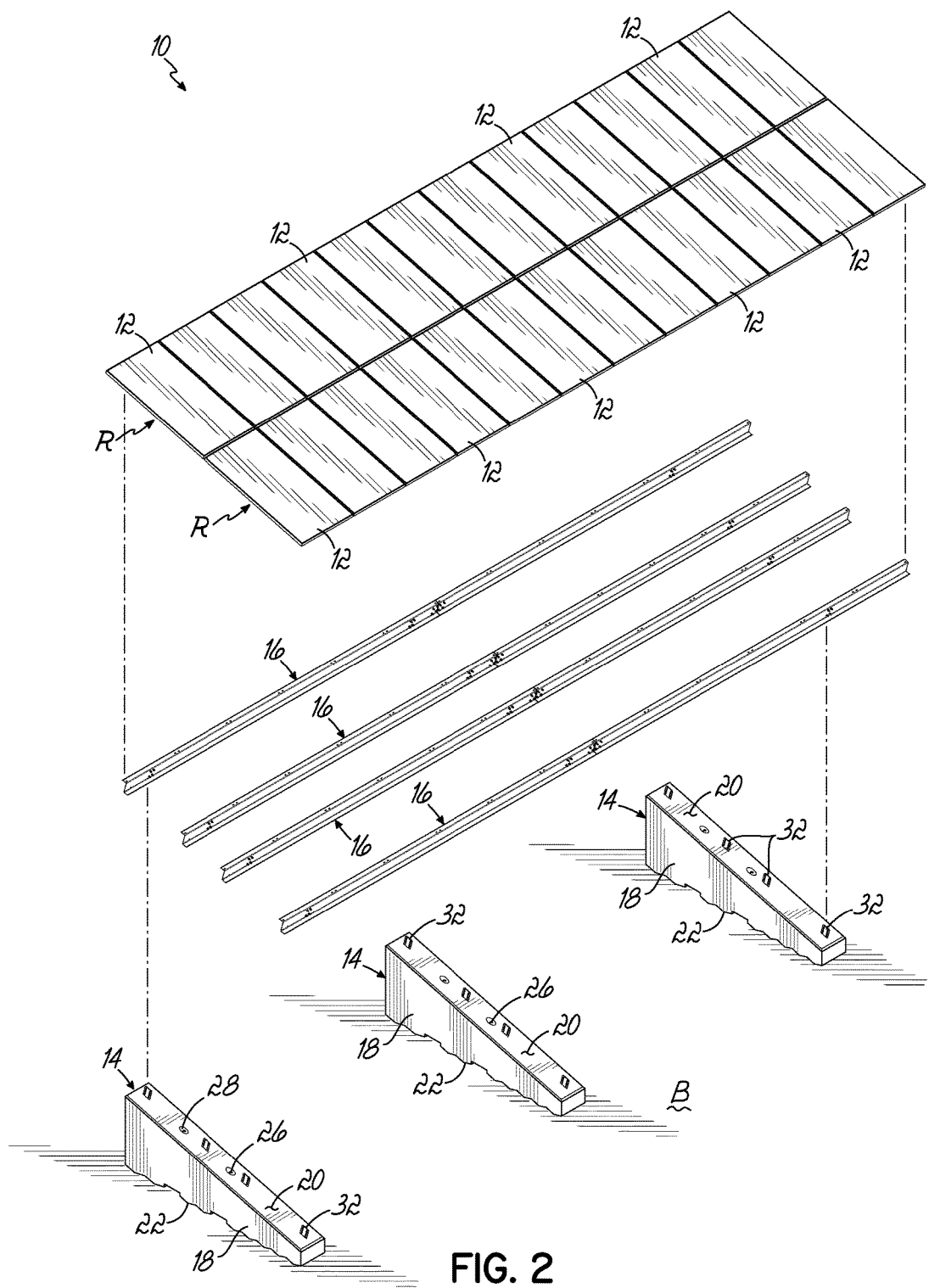
FIG. 2 is a disassembled front perspective view of the support system of FIG. 1.

Referring now to the Figures, and to FIGS. 1 and 2 in particular, a solar panel support system 10 in accordance with an exemplary embodiment of the invention is shown. The support system 10 is configured to support a plurality of solar panels 12, arranged in an array, above a base surface B, which may be a ground surface or a rooftop or other building surface, for example.

The support system 10 generally includes two or more support devices 14 that firmly rest on the base surface B, and a plurality of elongate purlins 16, also referred to as support rails, spanning between the support devices 14 and directly supporting the solar panels 12. Each of the purlins 16 is removably fastened at a lower surface to each of the support devices 14, and at an upper surface to frames of the solar panels 12.

As described in greater detail below, each of the support devices 14 advantageously includes a sloped upper mounting surface 20 for positioning the solar panels 12 angularly relative to the base surface B, and movable mounting components that enable fine adjustments of a height and an angle of the solar panels 12 relative to the upper mounting surface 20 and the base surface B.

Further, each of the support devices 14 is formed with integral ballast that provides the support devices 14 with masses sufficient to anchor the support system 10 to the base surface B without relying solely on base surface piercing elements or other base surface coupling elements. As such, the support system 10 may be implemented in locations in which such base surface coupling elements cannot be used or are otherwise inadequate for anchoring the system 10, such as in a landfill, for example.

In an exemplary embodiment, as shown in FIG. 2, the support system 10 may include three support devices 14 spaced generally equidistantly from one another for supporting an array of 24 solar panels 12, arranged in portrait orientation in two rows R. In alternative embodiments, any suitable quantity and arrangement of support devices 14 may be provided to support any suitable quantity of solar panels 12, arranged in any suitable quantity of rows R and in any suitable orientation. For example, a suitable quantity of support devices 14 may be arranged to support up to three rows R of panels 12 arranged in portrait orientation, or up to eight rows R of panels 12 arranged in landscape orientation.

The plurality of support devices 14 of support system 10 may be selectively spaced from another, with uniform or non-uniform spacing among adjacent pairs of support devices 14, for supporting any suitable quantity of solar panels 12 arranged in any suitable orientation, such as portrait or landscape orientation. For example, as shown best in FIG. 1, the support devices 14 may be spaced from one another such that up to five or more portrait-orientated solar panels 12 of each row R are supported by each adjacent pair of support devices 14. That is, in each row R, up to five or more portrait-oriented panels 12 may extend between a respective pair of support devices 14, which may include partially extending across the width of one or both of the support devices 14. Accordingly, each pair of support devices 14 of the exemplary embodiment shown herein may support up to ten or more solar panels 12 arranged in portrait orientation. It will be appreciated that each pair of support devices 14 may be suitably spaced from one another for supporting various alternative quantities and configurations of solar panels 12.

As described above, the plurality of support devices 14 of the support system 10 may be selectively interspaced with uniform or non-uniform spacing. For example, a first pair of the support devices 14 of the support system 10 may be interspaced with a first spacing for supporting a first quantity of solar panels 12 with the first pair. Further, a second pair of the support devices 14 of the support system 10, which may share a support device 14 with the first pair, may be interspaced with a second spacing for supporting a second quantity of solar panels 12 with the second pair.

Figure 3:
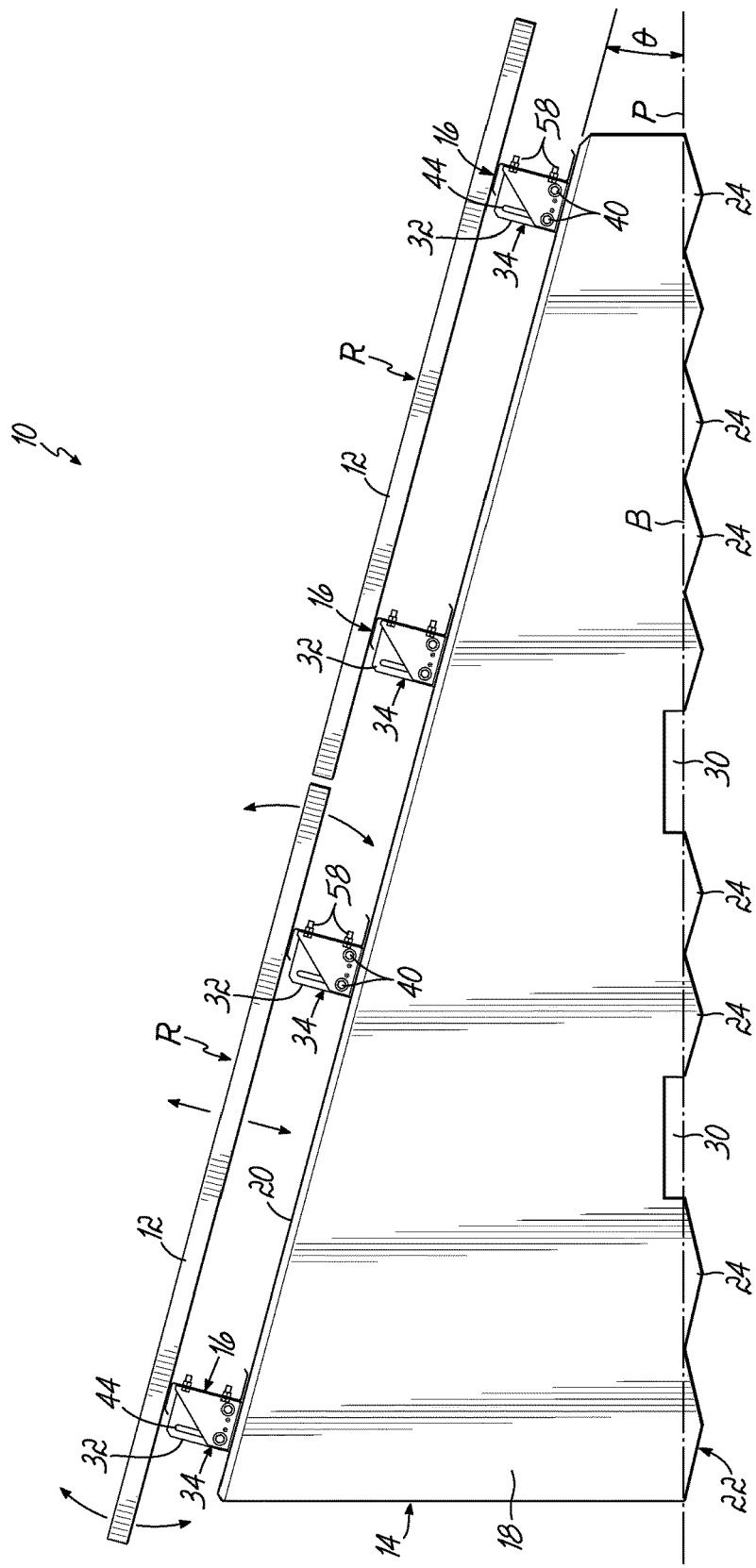
FIG. 3 is a side elevation view of the support system of FIG. 1, including a plurality of support devices.
Figure 4:
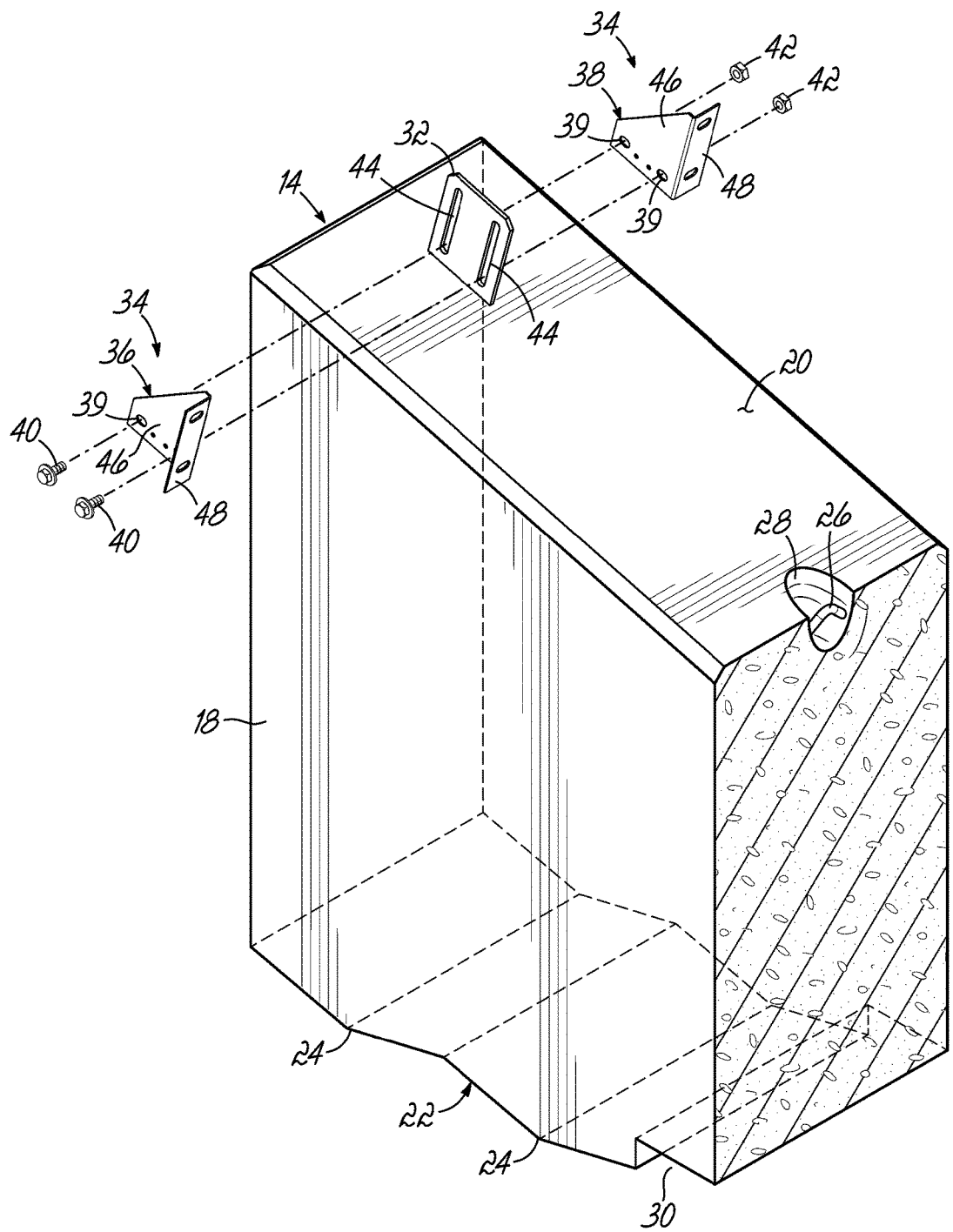
FIG. 4 is a breakaway front perspective view of a support device of the support system of FIG. 1.
Figure 5:
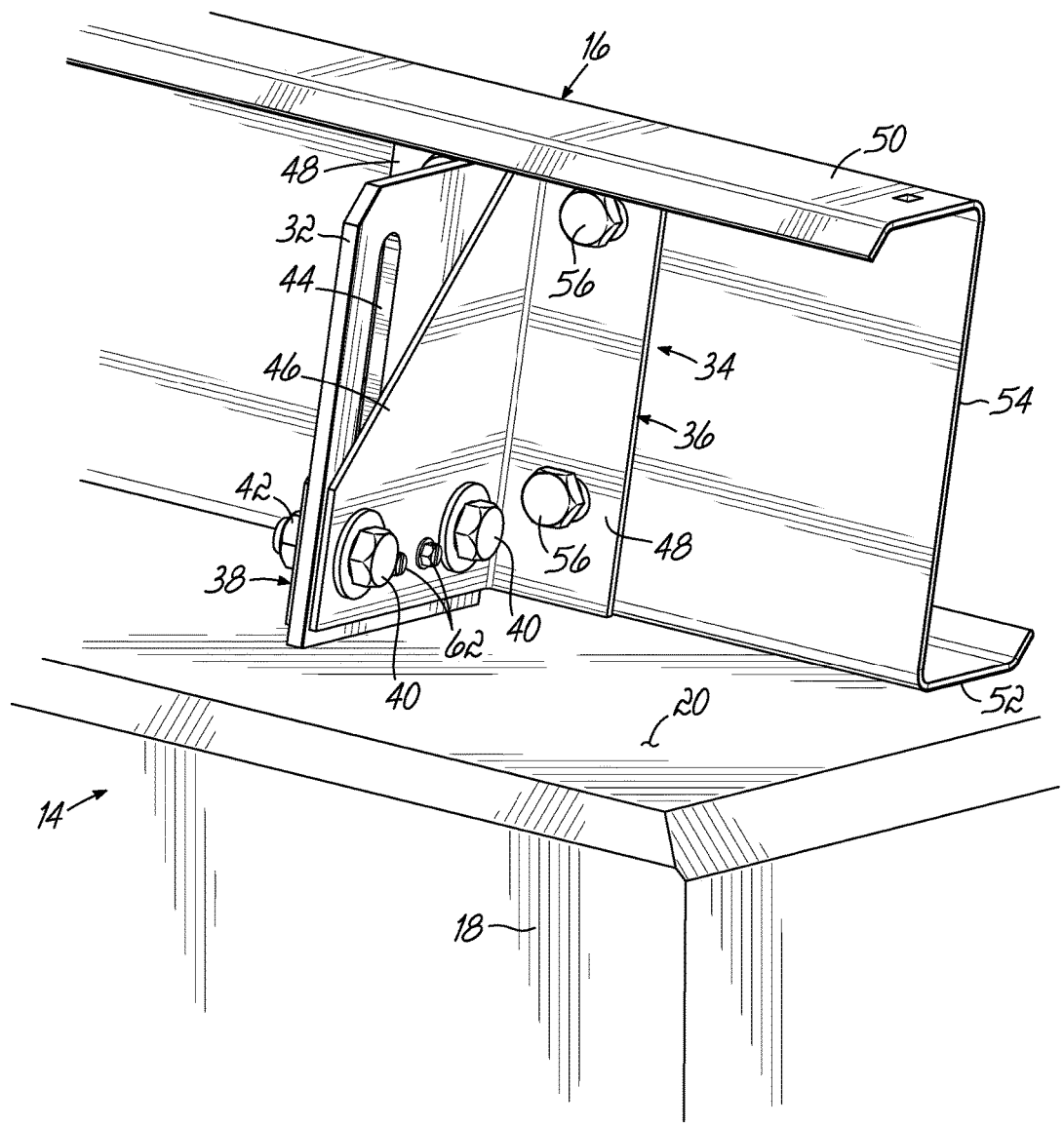
FIG. 5 is an enlarged rear perspective view of the support device of the system of FIG. 1, showing details of a mounting element and a purlin bracket coupled to a purlin.

Referring to FIGS. 3-5, additional details of the support devices 14 will now be described. Each support device 14 includes a body 18 that is substantially wedge shaped and includes a lower base surface 22 that rests on the base surface B (as shown in FIG. 1), an upper mounting surface 20 formed angularly, or sloped, relative to the lower base surface 22, and integral ballast. In the exemplary embodiment shown herein, the body 18 is formed with a generally constant cross-sectional width (i.e., in a direction transverse to a longitudinal length of the body 18) so as to define a generally rectangular transverse cross-section, as shown in FIG. 4. In alternative embodiments, the body 18 may be formed with multiple or varying cross-sectional widths so as to define a transverse cross-section of various other shapes.

Figure 3A:
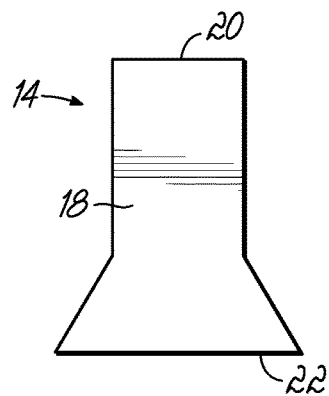
FIG. 3A is a diagrammatic rear elevation of a support device according to an exemplary alternative embodiment.
Figure 3B:
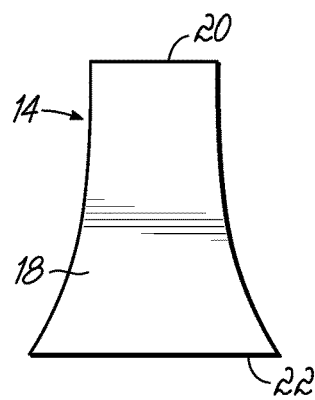
FIG. 3B is a diagrammatic rear elevation of a support device according to another exemplary alternative embodiment.
Figure 3C:
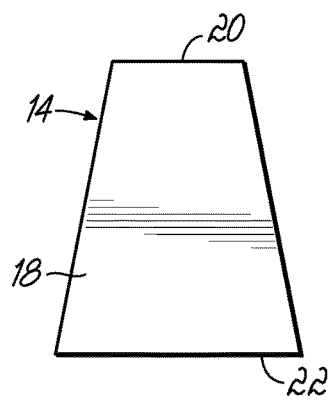
FIG. 3C is a diagrammatic rear elevation of a support device according to another exemplary alternative embodiment.

For example, as shown diagrammatically in FIGS. 3A, 3B, and 3C, respectively, the body 18 may be shaped with varying cross-sectional widths so as to define a generally trapezoidal transverse cross-section having faceted side surfaces, arcuate side surfaces, or continuous planar side surfaces, for example, or any combination thereof. To that end, the lower base surface 22 may be formed with a large first cross-sectional width that tapers inwardly in an upward direction toward the upper mounting surface 20 having a smaller second cross-sectional width. It will be appreciated that in additional alternative embodiments the body 18 may be formed with various other transverse cross-sectional shapes suitable for enabling the support device 14 to rest in a secure and stable position on the base surface B, particularly when loaded with support panels 12 exposed to external wind forces.

As best shown in FIG. 3, the upper mounting surface 20 of the support device body 18 is sloped, or angular, relative to the lower base surface 22 for angling the solar panels 12 relative to the base surface B. More specifically, the upper mounting surface 20 is sloped relative to a plane P defined by the lower base surface 22, and the support device 14 is positioned during installation such that the plane P is generally parallel to the base surface B. In an exemplary embodiment, the body 18 may be shaped so as to define a slope angle θ between the upper mounting surface 20 and the plane P of approximately 5 degrees to approximately 25 degrees. For example, the slope angle θ may be approximately 10 degrees, 15 degrees, or 20 degrees. It will be appreciated that the body 18 may be shaped with various other slope angles θ for achieving any desired slope angle of the solar panels 12 relative to the base surface B in a particular application.

The integral ballast of the support device body 18 may be provided by the material from which the body 18 is formed. In one embodiment, the body 18 may be formed of concrete having a strength rating of approximately 2,500 PSI (pounds per square inch), for example. The concrete may be supported by an internal support structure (not shown), such as a steel rebar framework, for example. Various alternative materials of similar or other strengths may be used in alternative embodiments of the invention.

Advantageously, the integral ballast of the support device body 18 provides the support device 14 with a mass sufficient to securely anchor the support device 14, and collectively the support system 10, to the base surface B without use of base surface coupling elements, such as piercing elements, and without addition of modular ballast pieces. In an exemplary embodiment, the support device 14 may be formed with a mass ranging from approximately 2,000 lbs to approximately 10,000 lbs. The mass may be selected based on the type of base surface B on which the support system 10 is to be installed, and on the quantity of solar panels 12 to be supported. For example, in roof mount applications the support device 14 may be formed with a lesser mass, such as 2,000 lbs to 3,000 lbs, while in ground mount applications the support device 14 may be formed with a greater mass, such as 6,000 lbs or more. It will be appreciated that the masses of the support device 14 disclosed herein are merely exemplary, and that masses less than 2,000 lbs for roof mount applications, or greater than 10,000 lbs for ground mount applications, may also be suitable.

The shape and dimensions of the support device body 18 may be selected so as to achieve a desired mass of the support device 14 using a desired material or mixture of materials. For example, in an exemplary embodiment, the illustrated wedge-shaped body 18 may be formed of concrete and with a base length of approximately 11.2 feet, a rear height of approximately 4.01 feet, a front height of approximately 1.0 feet, a width of approximately 1.5 feet, and a slope angle θ of approximately 15 degrees.

As best shown in FIGS. 3 and 4, the lower base surface 22 of the support device body 18 may be formed non-uniformly for enhancing frictional engagement of the lower base surface 22 with the base surface B. For example, as shown in the Figures, in one embodiment the lower base surface 22 may be corrugated so as to include a plurality of pointed teeth 24 extending downwardly from the body 18. In another embodiment, not shown, the lower base surface 22 may be textured or otherwise provided with a rough finish. In yet another embodiment, not shown, the lower base surface 22 may include one or more thin protrusions, such as metal spike members, extending downwardly from the body 18 and configured to penetrate the base surface B. Advantageously, the non-uniformity of the lower base surface 22 provides the support system 10 with improved stability and aids in adequately securing the support system 10 to the base surface B, particularly in areas in which the base surface B is sloped or is formed of loosely packed or non-uniform material, such as a hillside, for example.

The support device body 18 may further include one or more lifting elements that enable the support device 14 to be vertically lifted or lowered relative to the base surface B, for example during installation of the support system 10. In the exemplary embodiment shown herein, the lifting elements are in the form of lifting hooks 26 accessible within recesses 28 formed in the upper mounting surface 20, and lifting channels 30 formed in the lower base surface 22 and extending across a width of the body 18. The lifting hooks 26 are permanently coupled to the body 18. For example, the hooks 26 may be precast with concrete forming the body 18. Additionally, the hooks 26 may be recessed within the recesses 28 so as to not extend beyond the upper mounting surface 20. In use, the lifting hooks 26 may be coupled to external straps or hooks attached to a lifting device, such as the forks of a forklift truck, for lifting the support device 14. The lifting channels 30 may be formed with a width sufficient to receive therethrough one or more forks of a forklift truck, for example.

Referring to FIGS. 3-5, attachment and adjustment of the solar panels 12 relative to the support devices 14 will now be described in greater detail. A plurality of mounting elements shown in the form of mounting tabs 32 extend upwardly from the upper mounting surface 20 of the support device body 18. The tabs 32 are spaced apart along the length of the upper mounting surface 20, and are permanently connected to the body 18, for example by being precast with concrete forming the body 18. Each mounting tab 32 of a support device 14 supports a respective one of the purlins 16 of the system 10 shown in FIGS. 1 and 2. Further, each pair of mounting tabs 32 of a support device 14, and respective pair of purlins 16 supported by the mounting tabs 32, supports a respective row R of solar panels 12, as shown in FIGS. 1 and 2. The support devices 14 of the illustrated embodiment each include two pairs of mounting tabs 32 for supporting two sets of purlins 16 and two respective rows R of solar panels 12. In alternative embodiments, one to three pairs of mounting tabs 32 may be provided on each support device 14 for supporting one to three respective rows R of solar panels 12. It will be appreciated that various other quantities of mounting tabs 32 may be provided for supporting any suitable number of rows R of solar panels 12. Furthermore, while the tabs 32 shown herein are generally planar and rectangular in shape, various alternative shapes and configurations may be used.

As shown in FIGS. 4 and 5, each mounting tab 32 of each support device 14 couples to a respective purlin bracket 34, which is fastened to a respective one of the purlins 16. Each purlin bracket 34 includes first and second bracket halves 36, 38 that are clamped together on either side of the mounting tab 32 using bolt fasteners 40 and nuts 42. The mounting tab 32 includes a pair of parallel fastener slots 44 and each bracket half 36, 38 includes a pair of fastener apertures 39 through which the bolt fasteners 40 are received for clamping the bracket 34 to the mounting tab 32. Each of the bracket halves 36, 38 includes a trapezoidal base plate 46 and a flange 48 extending perpendicularly therefrom and providing the bracket half 36, 38 with an L-shape. As shown best in FIG. 5, the base plates 46 clamp and couple to the mounting tab 32, and the flanges 48 couple to a common purlin 16. The mounting tabs 32, brackets 34, and purlins 16 may be formed of galvanized steel, for example, or various other suitably rigid materials. Adjustability of the brackets 34 relative to the mounting tabs 32 is described below in connection with FIGS. 6A-6C.

As best shown in FIG. 5, each of the purlins 16 extends longitudinally and may be formed with a Z-shaped cross-section defining an upper flange 50 and a generally parallel lower flange 52 spaced from one another and extending from opposite ends of a central wall 54. It will be appreciated that in alternative embodiments the purlins 16 may be formed with various other cross-sections, such as C-shaped, tube-shaped, hat-shaped, or I-beam, for example. Additionally, each purlin 16 may be formed of two or more linear portions interconnected to achieve any desired length.

Figure 6A:
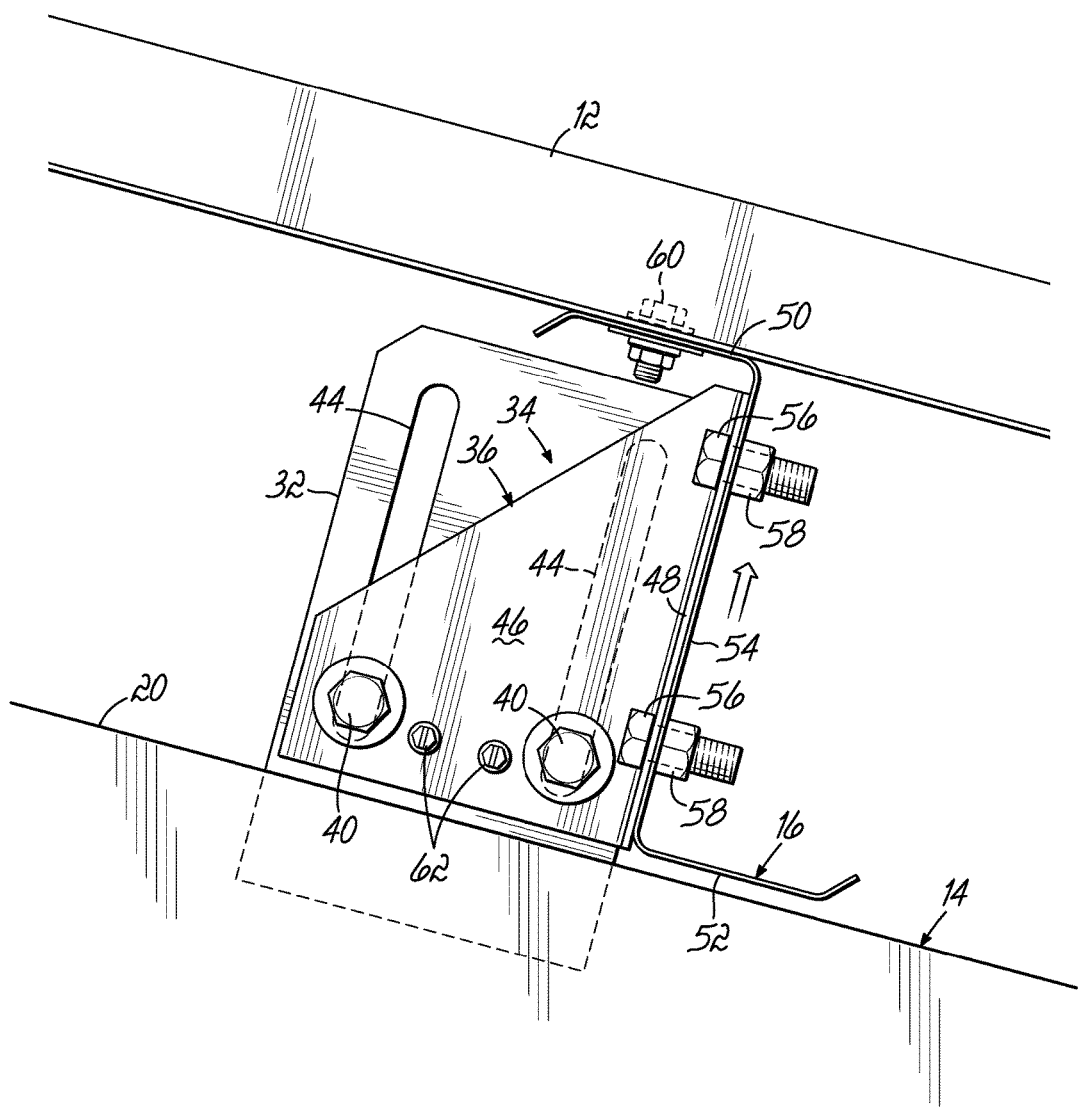
FIG. 6A is an enlarged side elevation view of the support system of FIG. 1, showing the bracket in a first linear position relative to the mounting element.

Referring to FIGS. 5 and 6A, the central wall 54 of each Z-shaped purlin 16 may include a grouping of fastener apertures at each location along the length of the purlin 16 at which the purlin 16 couples to a bracket 34 of a respective one of the support devices 14, using bolt fasteners 56 and nuts 58. The lower flange 52 confronts the upper mounting surfaces 20 of the support devices 14 across which the purlin 16 extends. The upper flange 50 is configured to couple to the undersides of the frames of the solar panels 12 using a plurality of bolt fasteners 60 and corresponding nut elements. In exemplary embodiments, the solar panels 12 may be coupled to the purlins 16 using bolt fasteners or rivets and corresponding steps as generally shown and described in U.S. Patent Publication No. 2015/0000725, the disclosure of which is hereby incorporated by reference herein in its entirety.

An exemplary method of assembling the components of the support system 10 shown herein is described below. First, brackets 34 are fastened to each of the mounting tabs 32 of the support devices 14 in the manner described above. Next, the support devices 14 are arranged linearly on the base surface B such that the mounting tabs 32 of each support device 14 are substantially aligned with the corresponding mounting tabs 32 of the adjacent support devices 14. Additionally, the support devices 14 are positioned with an interspacing suitable for supporting a desired quantity of solar panels 12 per each pair of support devices 14. For example, for supporting two rows R of five support panels 12 arranged in portrait orientation per each pair of support devices 14, as shown herein, the support devices 14 may be spaced apart at approximately 16.6 feet or less, as measured from an imaginary center plane extending lengthwise through each of the support devices 14.

Next, each purlin 16 is positioned transversely across the support devices 14 and fastened to each bracket 34 of a particular row of brackets 34 coupled to a corresponding row of mounting tabs 32, in the manner described above. For example, a first purlin 16 is coupled to the upper row of brackets 34, and second, third, and fourth purlins 16 are coupled to successively lower rows of brackets 34, respectively. Finally, the frames of the solar panels 12 are coupled to the purlins 16 in the manner described above. As shown in the illustrated embodiment, the purlins 16 may be arranged in pairs for supporting a corresponding row R of solar panels 12.

Referring to FIGS. 3 and 6A-6C, following assembly of the support system 10, a height position and an angular position of each row R of panels 12 relative to the upper mounting surfaces 20 of the support devices 14 may be independently and selectively fine-tune adjusted, as indicated in the Figures by movement arrows. As described below, such adjustments may be performed by moving the brackets 34 relative to their respective mounting tabs 32.

Figure 6B:
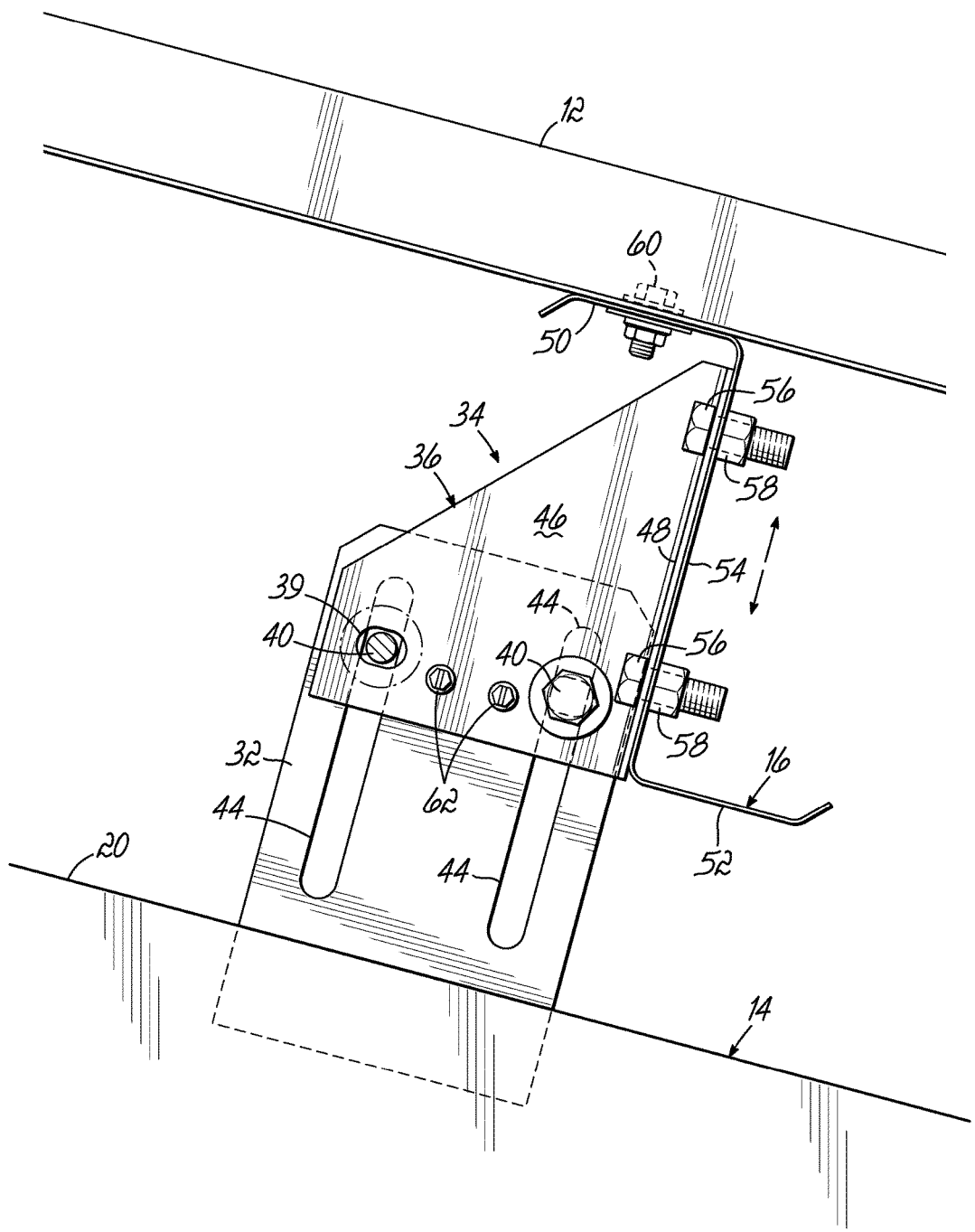
FIG. 6B is a view similar to FIG. 6A, showing the bracket in a second linear position relative to the mounting element, with a bolt fastener being shown in cross-section.

As shown in FIGS. 6A and 6B, a height position of each row R of solar panels 12 relative to the upper mounting surfaces 20 is independently adjustable by sliding the brackets 34 of the row R relative to their respective mounting tabs 32 in linear directions defined by the elongate slots 44 formed in the mounting tabs 32. In particular, the bolt fasteners 40 and nuts 42 coupling the brackets 34 to the mounting tabs 32 are first loosened, then the row R of solar panels 12 is raised or lowered a desired amount, and finally the nuts 42 are retightened to secure the row R of panels 12 in its new height position. Each bracket half 36, 38 may be fitted with a set of anchor elements, shown in FIG. 6A in the form of self-tapping screws 62 that are threaded through the base plate 46 and engage a respective side of the mounting tab 32, to enhance the clamping effect provided by the bolt fasteners 40 and nuts 42.

The lengths of the slots 44 formed in the mounting tabs 32 define the available range of linear height adjustment of the brackets 34 and solar panels 12. In an exemplary embodiment, the slots 44 may be formed with lengths sufficient to provide an available height adjustment of up to 4.5 inches. It will be appreciated that in alternative embodiments the mounting tabs 32 and the slots 44 may be formed with longer or shorter lengths to provide larger or smaller available ranges of linear height adjustment.

Figure 6C:
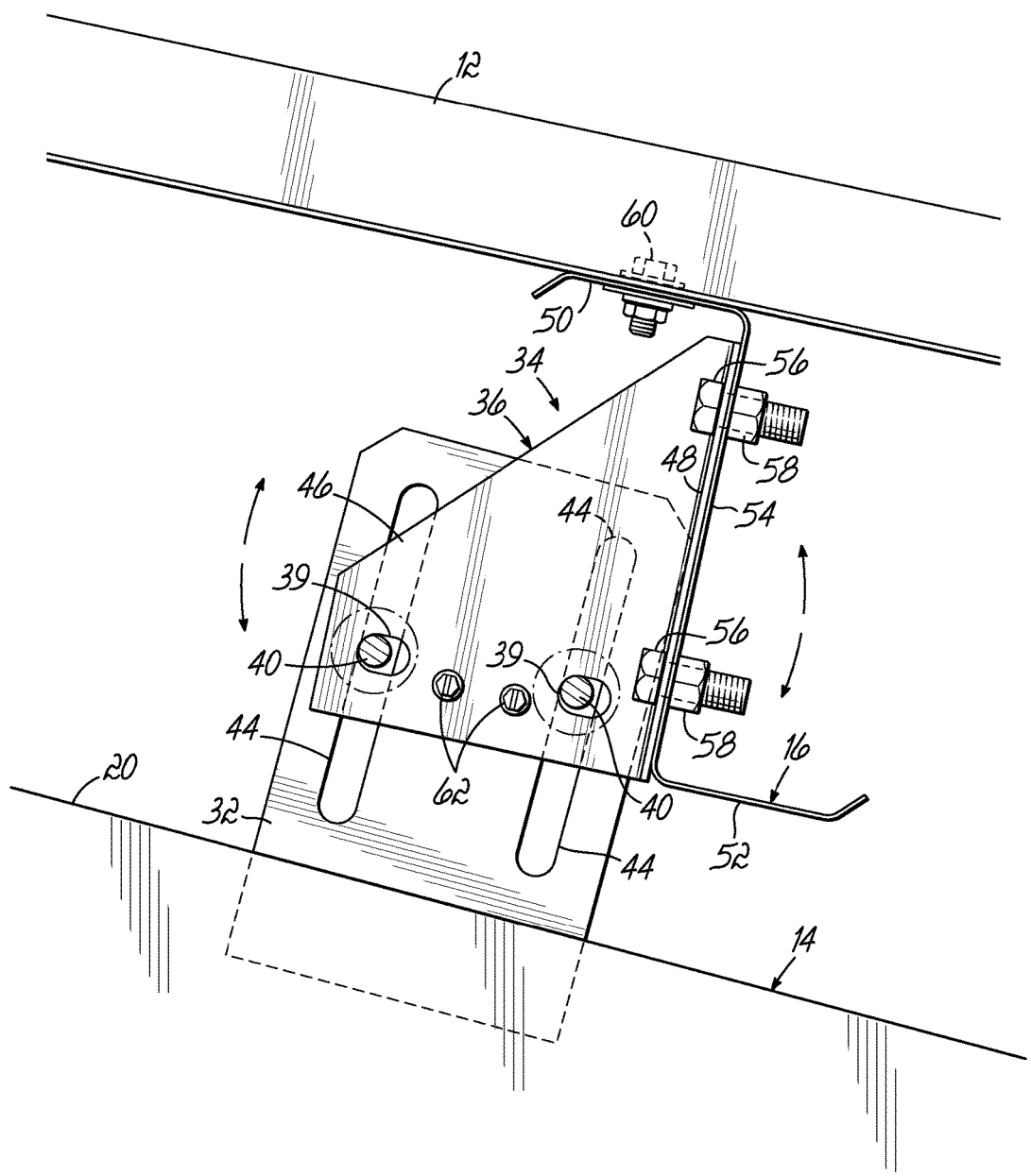
FIG. 6C is a view similar to FIGS. 6A and 6B, showing pivoting of the bracket relative to the mounting element, with multiple bolt fasteners being shown in cross-section.

As shown in FIG. 6C, an angular position of each row R of solar panels 12 relative to the upper mounting surfaces 20 is independently adjustable by pivoting the brackets 34 of the row R relative to their respective mounting tabs 32. To this end, the fastener apertures 39 formed in the bracket halves 36, 38 may be sized slightly larger than the bolt fasteners 40 and with an oblong shape, which enables the bracket 34 to slightly pivot relative to the mounting tab 32 about an axis extending transversely through the bracket 34 and the tab 32 at a location between the fastener apertures 39. In an exemplary embodiment, the brackets 34 may be formed to enable angular adjustment of 13 degrees in one direction and 16 degrees in an opposite direction, measured from a neutral position in which the solar panels 12 are parallel to the upper mounting surfaces 20 of the support devices 14.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A support device for supporting a solar panel above a base surface, comprising:
   a body including an upper mounting surface, a lower base surface, and integral ballast, the upper mounting surface being sloped relative to the lower base surface;
   at least one mounting element comprising a tab projecting upwardly from the upper mounting surface and being configured to support a solar panel,
   the at least one mounting element being permanently coupled to the body; and
   a bracket coupled to the at least one mounting element and being configured to support the solar panel, the bracket being linearly movable relative to the at least one mounting element for selectively adjusting a height of the solar panel relative to the upper mounting surface.

2. The support device of claim 1, wherein the bracket is pivotable relative to the at least one mounting element for adjusting an angular position of the solar panel relative to the upper mounting surface.

3. The support device of claim 1, wherein the bracket includes first and second bracket portions that clamp the at least one mounting element therebetween.

4. The support device of claim 1, further comprising:
   at least one lifting element configured to receive a lifting apparatus for lifting the support device vertically.

5. The support device of claim 4, wherein the at least one lifting element includes a hook permanently coupled to the body.

6. The support device of claim 4, wherein the at least one lifting element includes a channel formed in the lower base surface.

7. The support device of claim 1, wherein the body is wedge shaped.

8. The support device of claim 1, wherein at least a portion of the lower base surface is formed non-uniformly for frictionally engaging the base surface.

9. The support device of claim 1, wherein the body is formed of concrete.

10. The support device of claim 9, wherein the at least one mounting element is precast with the concrete body.

11. The support device of claim 1, wherein the support device has a mass of at least 2,000 lbs.

12. A solar panel support system for supporting a plurality of solar panels above a base surface, comprising:
   first and second support devices spaced apart from one another, each of the first and second support devices including:
      a body having an upper mounting surface, a lower base surface, and integral ballast, the upper mounting surface being sloped relative to the lower base surface, and
      first and second mounting elements comprising respective tabs projecting upwardly from the upper mounting surface and being configured to support the solar panels, each of the first and second mounting elements being permanently coupled to the body, and
      first and second brackets coupled to each of the respective first and second mounting elements and being configured to support the solar panels, each of the first and second brackets being linearly movable relative to the respective one of the first and second mounting elements for selectively adjusting a height of the solar panels relative to the respective upper mounting surface; and
   first and second purlins supported by and extending between the first and second mounting elements of the first and second support devices, the first and second purlins being, configured to support the solar panels.

13. The solar panel support system of claim 12, wherein each of the first and second brackets is pivotable relative to the respective one of the first and second mounting elements for adjusting an angular position of the solar panels relative to the respective upper mounting surface.

14. The solar panel support system of claim 12, wherein each of the first and second support devices further includes third and fourth mounting elements projecting upwardly from the upper mounting surface, the system further comprising:
   third and fourth purlins supported by and extending between the third and fourth mounting elements of the support devices,
   wherein the first and second mounting elements of the support devices and the first and second purlins extending therebetween support a first row of the solar panels, and
   wherein the third and fourth mounting elements of the support devices and the third and fourth purlins extending therebetween support a second row of the solar panels.

15. The solar panel support system of claim 12, wherein each of the support devices has a mass of at least 2,000 lbs.

16. The solar panel support system of claim 12, wherein each of the support devices is substantially wedge shaped.

* * * * *

UNITED STATES PATENT AND TRADEMARK OFFICE
CERTIFICATE OF CORRECTION

| | |
|---|---|
| PATENT NO. | : 10,250,181 B2 |
| APPLICATION NO. | : 15/286684 |
| DATED | : April 2, 2019 |
| INVENTOR(S) | : Vietas et al. |

It is certified that error appears in the above-identified patent and that said Letters Patent is hereby corrected as shown below:

In the Specification

In Column 1, Line 53, change "support devices are deficient in various respects." to --support devices is deficient in various respects.--.

In Column 3, Line 54, change "may be selectively spaced from another," to --may be selectively spaced from one another,--.

In Column 5, Line 32, change "approximately 1.0 feet," to --approximately 1.0 foot,--.

In the Claims

In Claim 12, Column 10, Line 4, change "the first and second purlins being, configured to support" to --the first and second purlins being configured to support--.

Signed and Sealed this
Eleventh Day of June, 2019

Andrei Iancu
*Director of the United States Patent and Trademark Office*